United States Patent
Osada

(10) Patent No.: US 11,314,665 B2
(45) Date of Patent: Apr. 26, 2022

(54) INFORMATION PROCESSING SYSTEM, INFORMATION PROCESSING DEVICE, BIOS UPDATING METHOD FOR INFORMATION PROCESSING DEVICE, AND BIOS UPDATING PROGRAM FOR INFORMATION PROCESSING DEVICE

(71) Applicant: NEC Platforms, Ltd., Kawasaki (JP)

(72) Inventor: Takumi Osada, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/962,087

(22) PCT Filed: Feb. 5, 2019

(86) PCT No.: PCT/JP2019/004037
§ 371 (c)(1),
(2) Date: Jul. 14, 2020

(87) PCT Pub. No.: WO2019/156062
PCT Pub. Date: Aug. 15, 2019

(65) Prior Publication Data
US 2020/0394144 A1 Dec. 17, 2020

(30) Foreign Application Priority Data
Feb. 7, 2018 (JP) .............................. JP2018-020275

(51) Int. Cl.
*G06F 13/16* (2006.01)
*G06F 8/65* (2018.01)
(Continued)

(52) U.S. Cl.
CPC ............ *G06F 13/1668* (2013.01); *G06F 8/65* (2013.01); *G06F 9/4401* (2013.01)

(58) Field of Classification Search
CPC ................. G06F 9/45; G06F 8/65; G06F 8/71
See application file for complete search history.

(56) References Cited

U.S. PATENT DOCUMENTS 5,835,761 A * 11/1998 Ishii ...................... G06F 11/1417
713/100
2008/0005553 A1 1/2008 Wang
(Continued)

FOREIGN PATENT DOCUMENTS

JP H08-16408 A 1/1996
JP 3066063 U 2/2000
(Continued)

OTHER PUBLICATIONS

International Search Report for PCT Application No. PCT/JP2019/004037, dated Mar. 19, 2019.
(Continued)

*Primary Examiner* — Getente A Yimer

(57) ABSTRACT

An information processing device includes: a BIOS flash ROM that is connected to a shared memory having an alternative BIOS written therein and being accessible using a MMIO, and that stores a currently used BIOS; a processor that can execute the currently used BIOS immediately after resetting; and a retaining means for retaining a setting indicating whether updating of the currently used BIOS is possible. The BIOS includes: a procedure for executing determination as to whether updating is possible after initialization necessary for executing the determination; a procedure for executing initialization necessary for updating the currently used BIOS to the alternative BIOS read from the shared memory, if updating is possible; a procedure for executing updating if updating is possible; a procedure for executing initialization necessary for operating the information processing device if updating is impossible; and a procedure for calling a boot loader if updating is impossible.

19 Claims, 8 Drawing Sheets

(51) Int. Cl.
    *G06F 9/4401*     (2018.01)
    *G06F 8/654*     (2018.01)

(56) References Cited

U.S. PATENT DOCUMENTS

| | | | |
|---|---|---|---|
| 2014/0040605 A1* | 2/2014 | Futral | G06F 21/572 |
| | | | 713/2 |
| 2014/0298141 A1* | 10/2014 | Grube | G06F 11/10 |
| | | | 714/768 |
| 2015/0261520 A1* | 9/2015 | Hsu | G06F 8/65 |
| | | | 713/1 |
| 2016/0147540 A1* | 5/2016 | Chiu | G06F 11/1441 |
| | | | 714/23 |

FOREIGN PATENT DOCUMENTS

| | | | |
|---|---|---|---|
| JP | 2008-176708 A | 7/2008 | |
| JP | 2011-253408 A | 12/2011 | |
| JP | 2015-130023 A | 7/2015 | |

OTHER PUBLICATIONS

English translation of Written opinion for PCT Application No. PCT/JP2019/004037, dated Mar. 19, 2019.
Kenji Mizukoshi, "Another Solaris (latter part)—Solaris 2.4 for x86–", bit, Jul. 1, 1995. vol. 27, No. 7, pp. 28 to 35, ISSN 0385-6984, specifically, p. 30, right column, line 37 to p. 31, left column, line 8, Japan.

* cited by examiner

INFORMATION PROCESSING SYSTEM, INFORMATION PROCESSING DEVICE, BIOS UPDATING METHOD FOR INFORMATION PROCESSING DEVICE, AND BIOS UPDATING PROGRAM FOR INFORMATION PROCESSING DEVICE

This application is a National Stage Entry of PCT/JP2019/004037 filed on Feb. 5, 2019, which claims priority from Japanese Patent Application 2018-020275 filed on Feb. 7, 2018, the contents of all of which are incorporated herein by reference, in their entirety.

TECHNICAL FIELD

The present invention relates to a technique for coping with a fault in a code of a basic input/output system (BIOS) and setting data (BIOS data).

BACKGROUND ART

BIOS data are commonly stored on a non-volatile memory (a BIOS flash ROM (hereinafter, simply referred to as a "BIOS flash" or a "BIOS ROM") or the like) in a system. When the BIOS data are broken due to a bit error or the like in a BIOS flash, a BIOS does not operate normally in some cases. In preparation for a case where the BIOS does not operate normally, a system may store a backup of the BIOS data.

One example of a technique for coping with a fault in the BIOS data is disclosed in PTL 1. A flash memory in PTL 1 includes a flash memory area for storing a BIOS (data), a fixed memory area for storing a BIOS for backup, and a switch. The BIOS stored on the flash memory area is updatable, but the BIOS for backup stored on the fixed memory area is not updatable. The switch selects, when a start of a system based on the BIOS stored on the flash memory area fails, the BIOS for backup stored on the fixed memory area. As a result of the above-described configuration, the flash memory in PTL 1 normally starts, even when the BIOS stored on the flash memory area is broken, the system by using the BIOS for backup.

Another example of the technique for coping with a fault in the BIOS data is disclosed in PTL 2. A fault tolerant server in PTL 2 includes two servers. Each server includes a system including a central processing unit (CPU), a BIOS ROM storing BIOS data, a base management controller (BMC), a memory to be used by the BMC, and an access switching circuit for switching connection between the BIOS ROM and the system or the BMC. The BMC of a first server reads, before the system of the first server starts, the BIOS data stored on the BIOS ROM onto the memory. The BMC of the first server requests, when the BIOS data of the first server have a fault, BIOS recovery data from the BMC of a second server, receives the BIOS recovery data transmitted from the BMC of the second server, and writes back the received BIOS recovery data onto the BIOS ROM of the first server. As a result of the above-described configuration, the server system in PTL 2 normally starts, even when a BIOS stored in one server is broken, the system by using a BIOS stored in the other server.

When the BIOS includes a bug (fault) or when a new function of the BIOS is needed, it is necessary to update the BIOS data stored on the BIOS ROM. When the BIOS data are updated by using a tool (such as a ROM writer) other than a system, the tool other than the system and time and effort for update work are necessary. Therefore, it is desirable to update the BIOS data by using the BIOS or the system.

BIOS data for update are commonly acquired via a medium (a compact disc (CD)), a digital versatile disc (DVD), or the like) or a network. As a result that the acquired BIOS data are broken, the BIOS data written on the BIOS ROM may be broken. In another case, when the acquired BIOS data are written on the BIOS ROM, the BIOS data written on the BIOS ROM may be broken. In another case, the BIOS may include a bug. However, when the BIOS data written on the BIOS ROM have a fault (BIOS data are broken, a BIOS includes a bug, or the like), it is difficult in some cases for the BIOS or the system to execute a function necessary for updating the BIOS (acquiring BIOS data via a medium or a network, updating a BIOS ROM based on acquired BIOS data, or the like). In such a case, it is necessary to update the BIOS data by using a tool other than the system.

In the technique in PTL 1, when the BIOS is unable to execute a function necessary for updating BIOS data due to a fault in the BIOS data stored on the fixed memory area, it is difficult for the BIOS or the system to update the BIOS data. In the technique in PTL 2, when the BIOS is unable to execute a function necessary for updating BIOS data due to faults in both pieces of the BIOS data stored on the BIOS ROMs of the two servers, it is difficult for the BIOS or the system to update the BIOS data.

One example of a technique being able to update a BIOS even when the BIOS data stored on the BIOS ROM have a fault is disclosed in PTL 3. In an information processing device in PTL 3, a service processor stores a floppy (registered trademark) disk (FD) image of firmware (BIOS) for recovery of a server module. The FD image does not affect a function of the service processor, and therefore can be freely updated in the service processor. The server module includes a device (universal serial bus (USB) storage) capable of receiving data, the device including a memory recognized as a USB storage. The service processor transfers, when update of BIOS data of the server module fails, the FD image to the USB storage of the server module. The server module then starts (virtually FD-boots) a system by using the FD image stored on the USB storage. As a result of the above-described configuration, the information processing device in PTL 3 can update, even when update of the BIOS data of the server module fails, the BIOS data of the server module when a correct FD image is prepared.

CITATION LIST

Patent Literature

[PTL 1] Japanese Registered Utility Model Publication No. 3066063
[PTL 2] Japanese Unexamined Patent Application Publication No. 2011-253408
[PTL 3] Japanese Unexamined Patent Application Publication No. 2008-176708

SUMMARY OF INVENTION

Technical Problem

However, the information processing device in PTL 3 acquires a BIOS image from the USB storage, and therefore the BIOS can be updated only after initialization of the USB storage. When a CPU is reset by power activation, the BIOS generally executes a power on self test (POST) and then starts a system by calling a boot program loader. In the POST, a series of processing steps including initialization of a CPU, initialization of a chip set, initialization of a main memory, initialization of a video function, initialization of a keyboard or a mouse, initialization of a hard disk drive (HDD) or a floppy disk drive (FDD), diagnosis of the HDD, diagnosis of the main memory, initialization of an expansion card, and the like is executed in a predetermined order. In other words, in the information processing device in PTL 3, in order to update the BIOS data of the server module, BIOS data relating to processing until an order to be executed reaches at least the initialization of the USB storage need to be normal. In other words, in the information processing device in PTL 3, there is a problem that, unless the BIOS data relating to processing until an order to be executed reaches at least the initialization of the USB storage are normal, the BIOS data of the server module cannot be updated.

In view of the above-described problem, the present invention has been made, and a main object thereof is to increase a possibility of updating BIOS data even when the BIOS data have a fault.

Solution to Problem

According to one aspect of the present invention, an information processing system includes: a shared memory being able to write and read data using memory mapped I/O; a BIOS data writing device being able to write desired substitution BIOS data being BIOS data onto the shared memory; and an information processing device including a BIOS flash that non-volatilely stores currently used BIOS data being the BIOS data, a processor being able to execute, immediately after resetting, a BIOS code included in the BIOS data stored on the BIOS flash, and an update setting retaining means that retains an update setting indicating whether the currently used BIOS data stored on the BIOS flash are updatable to the substitution BIOS data, wherein the BIOS code causes the processor to execute an update determination procedure of executing, after executing an initialization necessary for executing a determination procedure of determining whether the update setting acquired from the update setting retaining means is updatable, the determination procedure, an update-time initialization procedure of executing, when a determination result by the update determination procedure is updatable, an initialization necessary for executing an update procedure of updating the currently used BIOS data stored on the BIOS flash to the substitution BIOS data read from the shared memory, a BIOS update procedure of executing the update procedure when a determination result by the update determination procedure is updatable, a non-update-time initialization procedure of executing, when a determination result by the update determination procedure is not updatable, an initialization necessary for an operation of the information processing device, and a boot-loader call procedure of calling a boot loader when a determination result by the update determination procedure is not updatable.

According to one aspect of the present invention, an information processing device is an information processing device being connected to a shared memory on which desired substitution BIOS data being BIOS data are written, the shared memory being able to write and read data using memory mapped I/O, the device including: a BIOS flash that non-volatilely stores currently used BIOS data being the BIOS data; a processor being able to execute, immediately after resetting, a BIOS code included in the BIOS data stored on the BIOS flash; and an update setting retaining means that retains an update setting indicating whether the currently used BIOS data stored on the BIOS flash are updatable to the substitution BIOS data, wherein the BIOS code includes an update determination procedure of executing, after executing an initialization necessary for executing a determination procedure of determining whether the update setting acquired from the update setting retaining means is updatable, the determination procedure, an update-time initialization procedure of executing, when a determination result by the update determination procedure is updatable, an initialization necessary for executing an update procedure of updating the currently used BIOS data stored on the BIOS flash to the substitution BIOS data read from the shared memory, a BIOS update procedure of executing the update procedure when a determination result by the update determination procedure is updatable, a non-update-time initialization procedure of executing, when a determination result by the update determination procedure is not updatable, an initialization necessary for an operation of the information processing device, and a boot-loader call procedure of calling a boot loader when a determination result by the update determination procedure is not updatable.

According to one aspect of the present invention, a BIOS update method of an information processing device is a BIOS update method of an information processing device being connected to a shared memory on which desired substitution BIOS data being BIOS data are written, the shared memory being able to write and read data using memory mapped I/O, the device including a BIOS flash that non-volatilely stores currently used BIOS data being the BIOS data, a processor being able to execute, immediately after resetting, a BIOS code included in the BIOS data stored on the BIOS flash, and an update setting retaining means that retains an update setting indicating whether the currently used BIOS data stored on the BIOS flash are updatable to the substitution BIOS data, wherein the BIOS code executes an update determination procedure of executing, after executing an initialization necessary for executing a determination procedure of determining whether the update setting acquired from the update setting retaining means is updatable, the determination procedure, an update-time initialization procedure of executing, when a determination result by the update determination procedure is updatable, an initialization necessary for executing an update procedure of updating the currently used BIOS data stored on the BIOS flash to the substitution BIOS data read from the shared memory, a BIOS update procedure of executing the update procedure when a determination result by the update determination procedure is updatable, a non-update-time initialization procedure of executing, when a determination result by the update determination procedure is not updatable, an initialization necessary for an operation of the information processing device, and a boot-loader call procedure of calling a boot loader when a determination result by the update determination procedure is not updatable.

According to one aspect of the present invention, a BIOS update program of an information processing device causes, based on a BIOS code, a computer included in the information processing device being connected to a shared memory on which desired substitution BIOS data being BIOS data are written, the shared memory being able to write and read data using memory mapped I/O, the device including a BIOS flash that non-volatilely stores currently used BIOS data being the BIOS data, a processor being able to execute, immediately after resetting, the BIOS code included in the BIOS data stored on the BIOS flash, and an update setting retaining means that retains an update setting indicating whether the currently used BIOS data stored on the BIOS flash are updatable to the substitution BIOS data, to execute: an update determination procedure of executing, after executing an initialization necessary for executing a determination procedure of determining whether the update setting acquired from the update setting retaining means is updatable, the determination procedure; an update-time initialization procedure of executing, when a determination result by the update determination procedure is updatable, an initialization necessary for executing an update procedure of updating the currently used BIOS data stored on the BIOS flash to the substitution BIOS data read from the shared memory; a BIOS update procedure of executing the update procedure when a determination result by the update determination procedure is updatable; a non-update-time initialization procedure of executing, when a determination result by the update determination procedure is not updatable, an initialization necessary for an operation of the information processing device; and a boot-loader call procedure of calling a boot loader when a determination result by the update determination procedure is not updatable.

Advantageous Effects of Invention

According to the present invention, even when BIOS data have a fault, an advantageous effect of increasing a possibility of updating the BIOS data is produced.

EXAMPLE EMBODIMENT

Hereinafter, an example embodiment of the present invention is described in detail with reference to the drawings. In all the drawings, an equivalent component is assigned with the same reference sign, and description is omitted, as appropriate.

First Example Embodiment

A first example embodiment of the present invention being a base of example embodiments of the present invention is described.

A configuration according to the present example embodiment is described.

Figure 1:
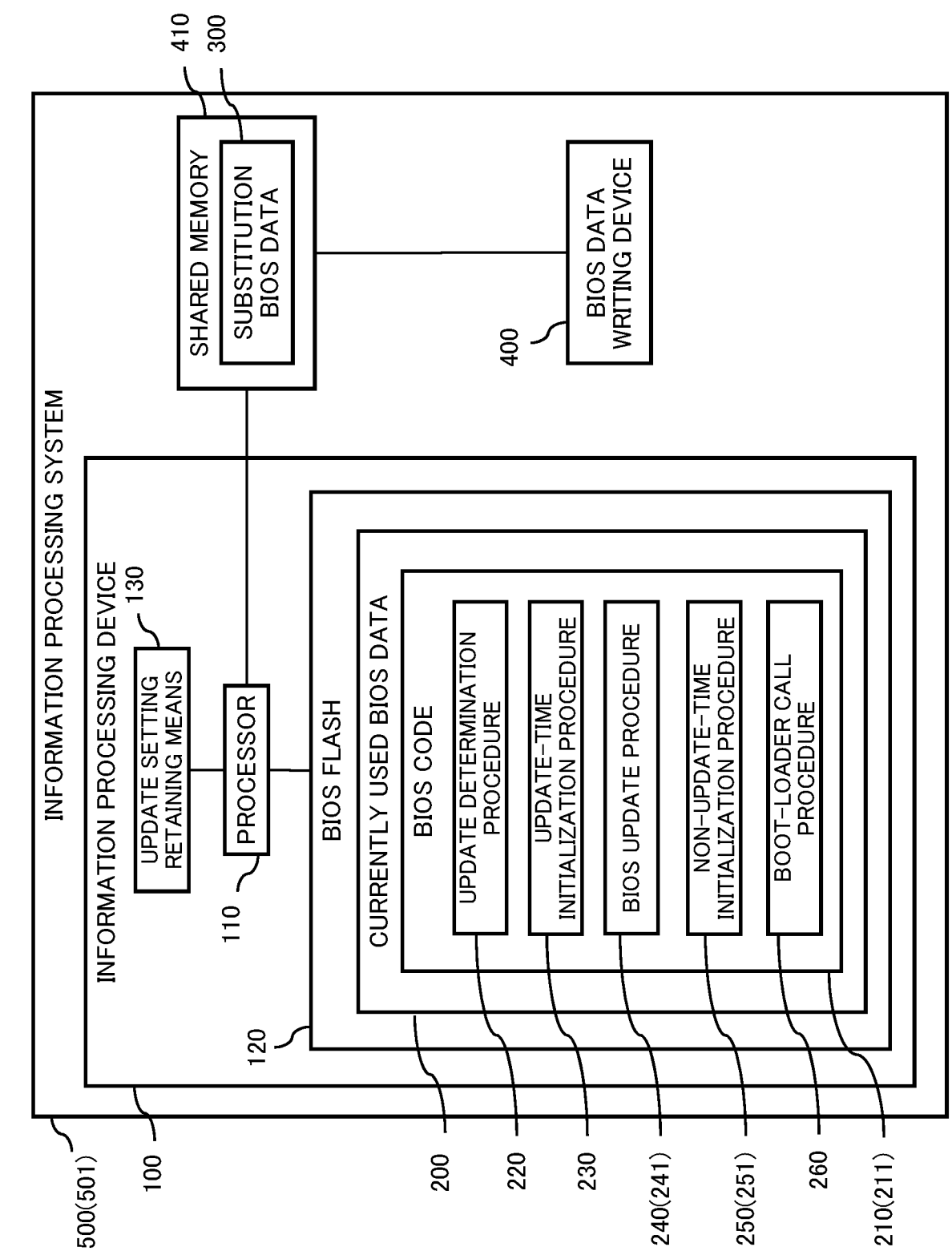
FIG. 1 is a block diagram illustrating one example of a configuration of an information processing device according to a first example embodiment of the present invention.

FIG. 1 is a block diagram illustrating one example of a configuration of an information processing device according to the first example embodiment of the present invention.

An information processing system 500 according to the present example embodiment includes a shared memory 410, a BIOS data writing device 400, and an information processing device 100.

The shared memory 410 is a memory capable of writing and reading data using memory mapped I/O (MMIO).

The BIOS data writing device 400 is a device capable of writing desired substitution BIOS data 300 being BIOS data onto the shared memory 410. The BIOS data writing device 400 is operable, regardless of whether the information processing device 100 is started.

The information processing device 100 includes a BIOS flash 120, a processor 110, and an update setting retaining means 130.

The BIOS flash 120 non-volatilely stores currently used BIOS data 200 being BIOS data.

The processor 110 is a processor capable of executing, immediately after resetting, a BIOS code 210 included in the BIOS data stored on the BIOS flash 120.

The update setting retaining means 130 retains an update setting indicating whether the currently used BIOS data 200 stored on the BIOS flash 120 are updatable to substitution BIOS data 300.

The BIOS code 210 includes an update determination procedure 220, an update-time initialization procedure 230, a BIOS update procedure 240, a non-update-time initialization procedure 250, and a boot-loader call procedure 260 executed by the processor 110.

The update determination procedure 220 executes, after executing an initialization necessary for executing a determination procedure of determining whether an update setting acquired from the update setting retaining means 130 is updatable, the determination procedure. Commonly, the above-described initialization necessary for executing the determination procedure includes an initialization of the processor 110 and an initialization of a platform controller hub (PCH) (not illustrated) necessary for acquiring the update setting retained in the update setting retaining means 130.

The update-time initialization procedure 230 executes, when a determination result based on the update determination procedure 220 is updatable, an initialization necessary for executing the BIOS update procedure 240. Commonly, the above-described initialization necessary for executing the BIOS update procedure 240 includes an initialization of a shared memory 410 necessary for the reading substitution BIOS data 300 from the shared memory 410.

The BIOS update procedure 240 updates, when a determination result based on the update determination procedure 220 is updatable, the currently used BIOS data 200 stored on the BIOS flash 120 to the substitution BIOS data 300 read from the shared memory 410.

The non-update-time initialization procedure 250 executes, when a determination result based on the update determination procedure 220 is not updatable, an initialization necessary for an operation of the information processing device 100. Commonly, the above-described initialization necessary for the operation of the information processing device 100 includes an initialization of a main memory (not illustrated) and an initialization of a peripheral (not illustrated) such as a video card, a keyboard, a mouse, an HDD, an expansion card, or the like. These initializations may include diagnosis of the main memory, the HDD, and the like.

The boot-loader call procedure 260 calls a boot loader when a determination result based on the update determination procedure 220 is not updatable.

An operation according to the present example embodiment is described.

Figure 2:
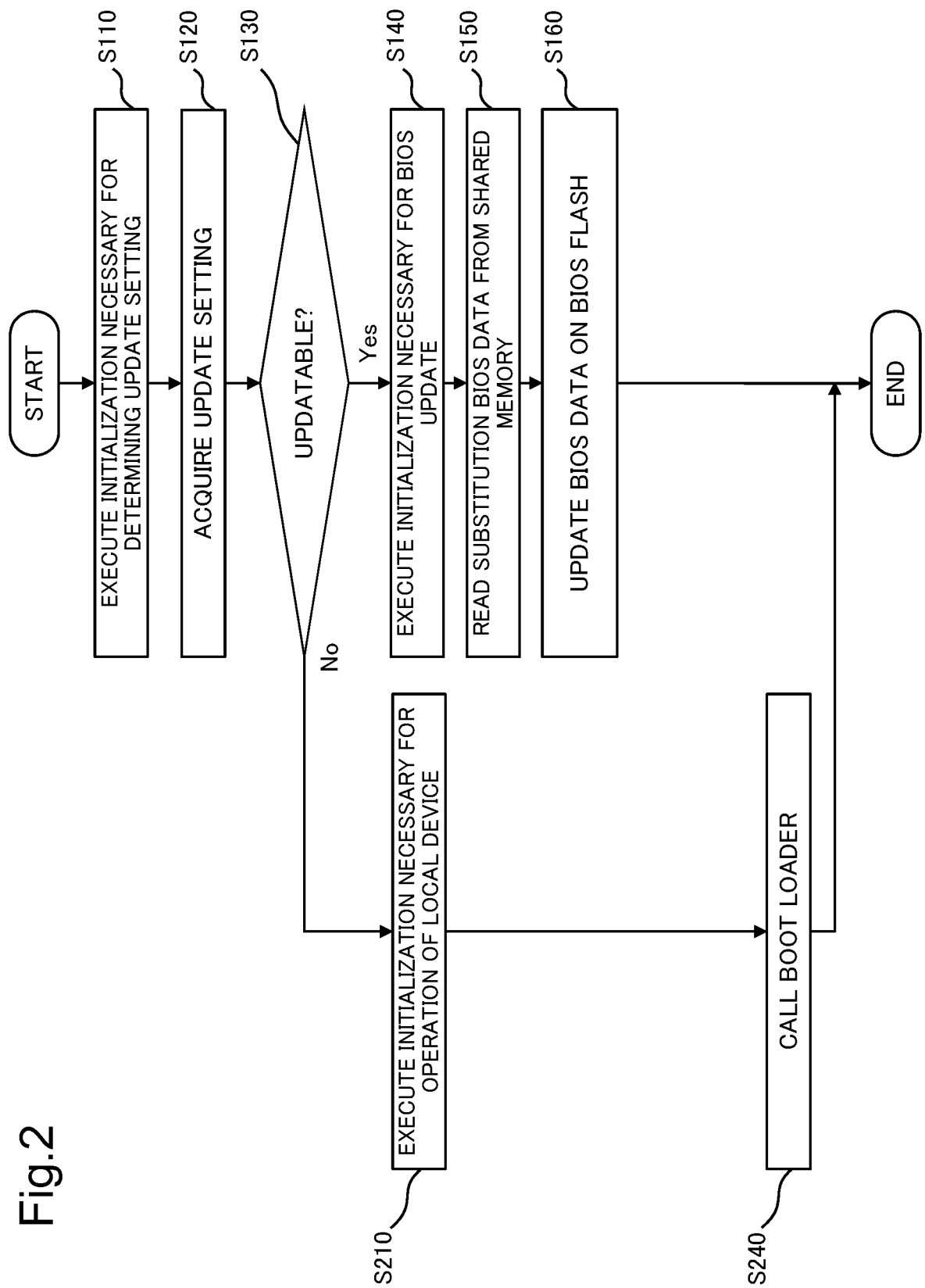
FIG. 2 is a flowchart illustrating an operation of the information processing device according to the first example embodiment of the present invention.

FIG. 2 is a flowchart illustrating an operation of the information processing device according to the first example embodiment of the present invention. The flowchart illustrated in FIG. 2 and the following description are one example, and according to appropriately determined processing, a processing order may be switched, processing may be returned, or processing may be repeated.

First, the information processing device 100 executes an initialization necessary for executing a determination procedure of determining whether an update setting acquired from the update setting retaining means 130 is updatable (step S110).

Next, the information processing device 100 acquires an update setting from the update setting retaining means 130 (step S120).

Subsequently, the information processing device 100 determines whether the acquired update setting is updatable (step S130).

When a determination result is updatable (Yes in step S130), the information processing device 100 executes an initialization necessary for executing BIOS update (step S140).

Subsequently, the information processing device 100 reads substitution BIOS data 300 from the shared memory 410 (step S150).

Subsequently, the information processing device 100 updates currently used BIOS data 200 stored on the BIOS flash 120 to the substitution BIOS data 300 read from the shared memory 410 (step S160) and terminates processing.

In contrast, when a determination result is not updatable (No in step S130), the information processing device 100 executes an initialization necessary for an operation of the information processing device 100 (step S210).

Subsequently, the information processing device 100 calls a boot loader (step S240) and terminates processing.

As described above, in the information processing system 500 according to the present example embodiment, the BIOS code 210 included in the currently used BIOS data 200 executed by the processor 110 executes, after executing the procedure (the update determination procedure 220 and the update-time initialization procedure 230) necessary before updating the currently used BIOS data 200, the procedure (the BIOS update procedure 240) of updating the currently used BIOS data 200 immediately without inserting another processing step. Even when, in the BIOS code 210, a code that is not executed during update of the currently used BIOS data 200 has a fault, the currently used BIOS data 200 can be normally updated when the code (the update determination procedure 220, the update-time initialization procedure 230, and the BIOS update procedure 240) executed during update of the currently used BIOS data 200 does not have a fault. In other words, the BIOS code 210 increases a possibility of being able to normally update the currently used BIOS data 200, compared with a case where before completing update of the currently used BIOS data 200 including a fault, the update determination procedure 220, the update-time initialization procedure 230, the BIOS update procedure 240, and other codes are executed. Therefore, the information processing device 100 according to the present example embodiment produces an advantageous effect of being able to increase a possibility of being able to update BIOS data even when the BIOS data have a fault.

The update-time initialization procedure 230 preferably executes, when executing an initialization necessary for the BIOS update procedure 240 (step S140), a minimum necessary initialization for executing the BIOS update procedure 240. When, for example, the information processing device 100 further includes a random access memory, the minimum necessary initialization for executing the BIOS update procedure 240 does not preferably include an initialization of the random access memory. In this case, an advantageous effect of maximizing a possibility of being able to normally update currently used BIOS data 200 is produced.

When a length of the substitution BIOS data 300 is larger than a storage capacity of the shared memory 410, the BIOS code 210 may read, in the BIOS update procedure 240, a portion of the substitution BIOS data 300 from the shared memory 410 and repeat directly writing the read portion onto the BIOS flash 120. In this case, an advantageous effect of reducing a cost of the shared memory 410 is produced.

The information processing device 100 may include the shared memory 410. In this case, an advantageous effect of simplifying the configuration of the information processing system 500 is produced.

The BIOS data writing device 400 may include the shared memory 410. In this case, an advantageous effect of simplifying the configuration of the information processing system 500 is produced.

Second Example Embodiment

Next, a second example embodiment of the present invention a base of which is the first example embodiment of the present invention is described. A BIOS code according to the present example embodiment is different in operation from the BIOS code according to the first example embodiment of the present invention.

With reference to FIG. 1 again, a configuration according to the present example embodiment is described.

The configuration according to the present example embodiment is the same as the configuration according to the first example embodiment of the present invention. However, a BIOS code 211 of an information processing system 501 according to the present example embodiment is different in operation from the BIOS code 210 of the information processing system 500 according to the first example embodiment of the present invention.

The BIOS code 211 includes a BIOS update procedure 241, instead of the BIOS update procedure 240.

The BIOS code 211 includes a non-update-time initialization procedure 251, instead of the non-update-time initialization procedure 250.

An operation according to the present example embodiment is described.

Figure 3:
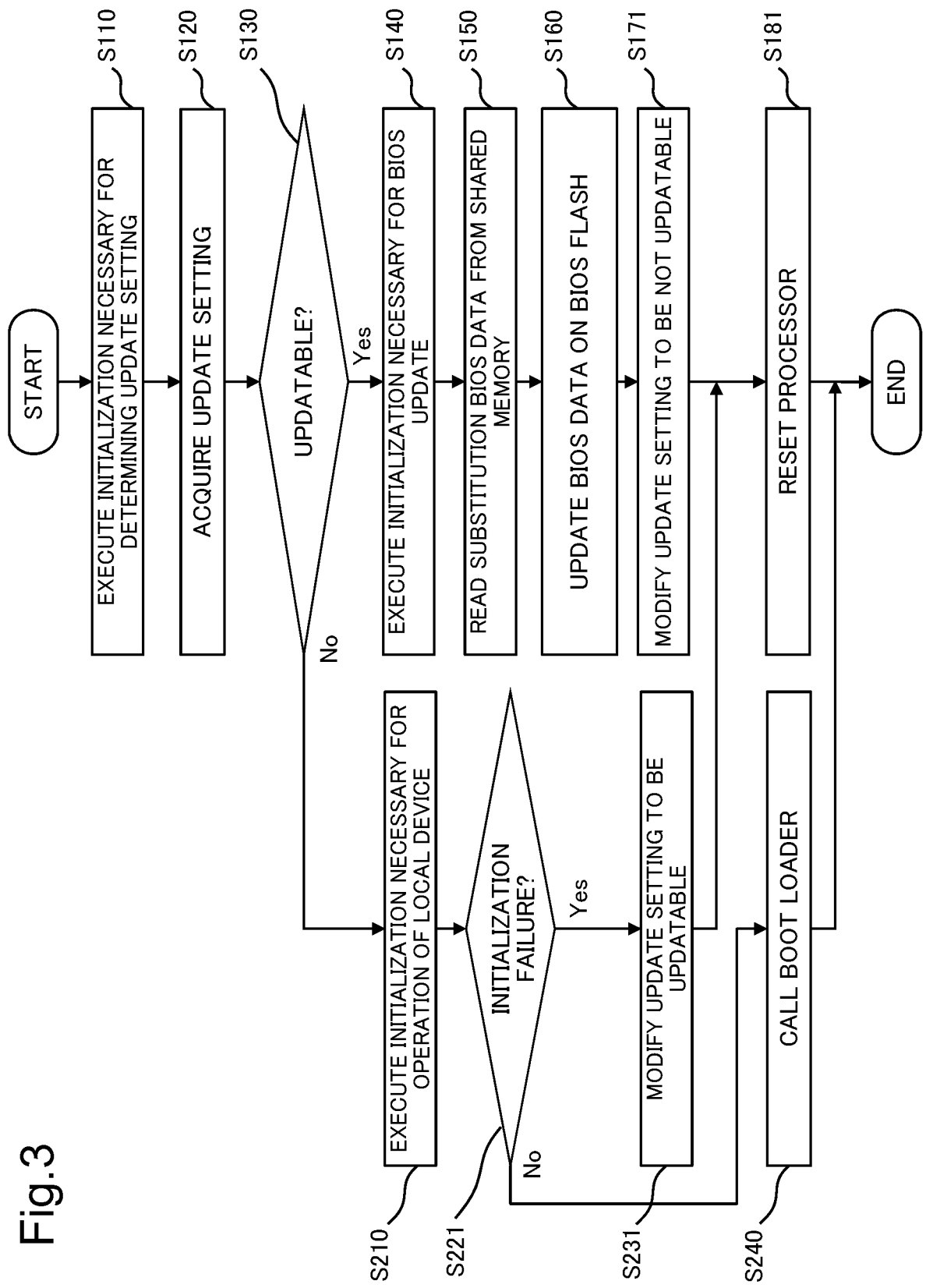
FIG. 3 is a flowchart illustrating an operation of an information processing device according to a second example embodiment of the present invention.

FIG. 3 is a flowchart illustrating an operation of an information processing device according to the second example embodiment of the present invention. A flowchart illustrated in FIG. 3 and the following description are one example, and according to appropriately determined processing, a processing order may be switched, processing may be returned, or processing may be repeated.

The BIOS update procedure 241 modifies, after executing the BIOS update procedure 240 (steps S150 and S160), an update setting retained in an update setting retaining means 130 to be not updatable (step S171). The BIOS update procedure 241 resets, after modifying the update setting (step S171 or S231 (described later)), a processor 110 (step S181).

The non-update-time initialization procedure 251 executes the non-update-time initialization procedure 250 (step S210). The non-update-time initialization procedure 251 modifies, when the non-update-time initialization procedure 250 (step S210) fails (Yes in step S221), an update setting retained in the update setting retaining means 130 to be updatable (step S231) and moves processing to step S181. In contrast, the non-update-time initialization procedure 251 moves processing to step S240 when the non-update-time initialization procedure 250 (step S210) does not fail (No in step S221).

Other operations according to the present example embodiment are the same as the operation according to the first example embodiment of the present invention.

As described above, except that the BIOS code 211 of the information processing system 501 according to the present example embodiment is different in operation from the BIOS code 210 of the information processing system 500 according to the first example embodiment of the present invention, the information processing system 501 according to the present example embodiment is the same as the information processing system 500 according to the first example embodiment of the present invention. While the BIOS code 211 includes the BIOS update procedure 241 instead of the BIOS update procedure 240, the BIOS update procedure 241 includes the BIOS update procedure 240. While the BIOS code 211 includes the non-update-time initialization procedure 251 instead of the non-update-time initialization procedure 250, the non-update-time initialization procedure 251 includes the non-update-time initialization procedure 250. Therefore, an advantageous effect of the information processing system 501 according to the present example embodiment includes the advantageous effect of the information processing system 500 according to the first example embodiment of the present invention.

In the information processing system 501 according to the present example embodiment, after currently used BIOS data 200 are updated, an update setting is modified to be not updatable (step S171). Therefore, the information processing system 501 according to the present example embodiment produces an advantageous effect in that it is unnecessary to manually modify the update setting.

In the information processing system 501 according to the present example embodiment, after the currently used BIOS data 200 are updated and the update setting is modified to be not updatable, the processor 110 is reset (step S181). Therefore, the information processing system 501 according to the present example embodiment produces an advantageous effect in that it is unnecessary to manually restart the information processing device 100.

In the information processing system 501 according to the present example embodiment, when an initialization (step S210) in normal start fails, the processor 110 is rest (step S181) after the update setting is modified to be updatable (step S231). Therefore, the information processing system 501 according to the present example embodiment produces an advantageous effect in that when an initialization in a BIOS fails, it is unnecessary to manually restart the information processing device 100 after the update setting is manually modified.

Third Example Embodiment

Next, a third example embodiment of the present invention a base of which is the second example embodiment of the present invention is described. According to the present example embodiment, a BIOS data writing device is a base management controller (BMC) conforming to an intelligent platform management interface (IPMI). According to the present example embodiment, a configuration and an operation of an information processing device (server) are described in more detail.

A configuration according to the present example embodiment is described.

Figure 4:
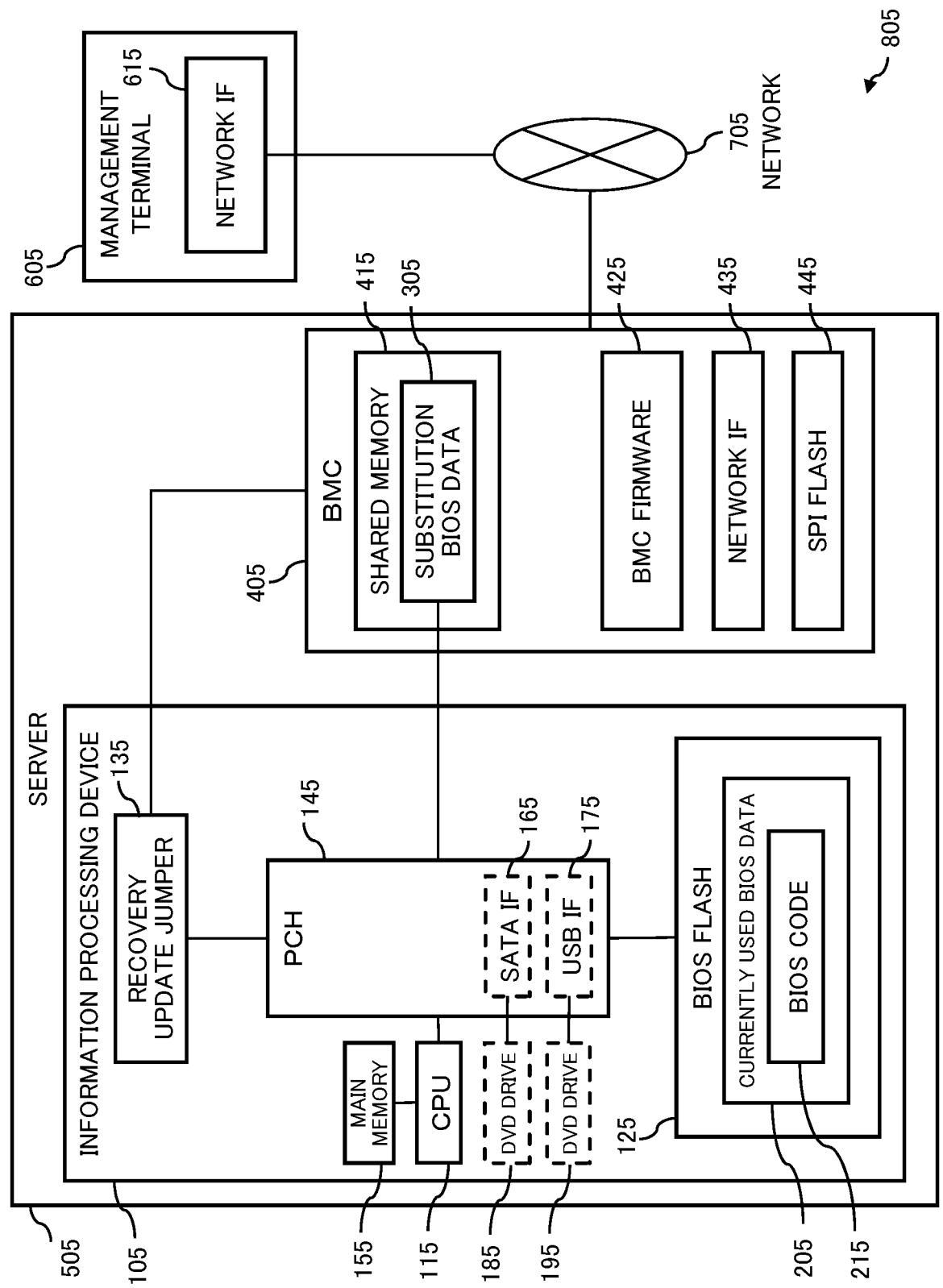
FIG. 4 is a block diagram illustrating one example of a configuration of an information processing device according to a third example embodiment of the present invention.

FIG. 4 is a block diagram illustrating one example of a configuration of a server system according to the third example embodiment of the present invention.

A server system 805 according to the present example embodiment includes a server 505 and a management terminal 605. The server 505 and the management terminal 605 are connected via a network 705.

The management terminal 605 is a communication terminal for performing maintenance, management, or the like of the server 505. The management terminal 605 operates a BMC 405. The management terminal 605 includes a network interface 615.

The network interface 615 communicates with the BMC 405.

The server 505 includes an information processing device 105 and the BMC 405. The server 505 may include equal to or more than two information processing devices 105 or equal to or more than two BMCs 405. A plurality of information processing devices 105 may be connected to one BMC 405.

The information processing device 105 includes a central processing unit (CPU) 115, a PCH 145, a main memory 155, a BIOS flash 125, and a recovery update jumper 135. The information processing device 105 may further include, for example, a DVD drive 185 including a serial advanced technology attachment (SATA) interface, a DVD drive 195 including a USB interface, or the like.

The CPU 115 controls a whole of the information processing device 105. The CPU 115 is connected to the PCH 145 and the main memory 155.

The PCH 145 manages a data path and assists a function of the CPU 115. When the information processing device 105 includes a device including a SATA interface or a USB interface, the PCH 145 includes a means (SATA interface 165) for responding to the SATA interface or a means (USB interface 175) for responding to the USB interface.

The main memory 155 is, for example, a random access memory (RAM).

The BIOS flash 125 is a flash read only memory (ROM) that non-volatilely stores currently used BIOS data 205. The currently used BIOS data 205 are BIOS data to be used by the CPU 115 at a time of starting the information processing device 105. The BIOS data include a BIOS code executable by the CPU 115 and setting data necessary for executing the BIOS code.

The recovery update jumper 135 is a switch retaining a setting relating to whether recovery update is executed. It is assumed that the recovery update is to rewrite the BIOS data stored in the BIOS flash 125 to desired BIOS data. It is assumed that the recovery update jumper 135 is controllable by an original equipment manufacturer (OEM) command of the IPMI.

The CPU 115 executes a BIOS code 215 included in the currently used BIOS data 205 stored on the BIOS flash 125. The BIOS code 215 initializes, as necessary, a shared memory 415 (described late) included in the BMC 405, the CPU 115, the PCH 145, the main memory 155, hardware being connected via the SATA interface 165 or the USB interface 175, or the like. The initialization may be a power on self test (POST). It is assumed that the BIOS code 215 can access the shared memory 415.

When direct current (DC) is fed to the information processing device 105, the BIOS code 215 is started by the CPU 115. In the following description, it is assumed that the BIOS code 215 initializes the shared memory 415 included in the BMC 405, the CPU 115, the PCH 145, the main memory 155, the SATA interface 165, and the USB interface 175 in this order.

The BMC 405 performs monitoring, control, management, or the like of the information processing device 105. The BMC 405 can operate, regardless of whether the information processing device 105 is started. The BMC 405 is connected to the information processing device 105 via the PCH 145. The BMC 405 can operate the recovery update jumper 135. The BMC 405 includes BMC firmware 425, a network interface 435, a shared memory 415, and a SPI flash 445. The BMC 405 can be operated by the management terminal 605 via the network 705. The BMC 405 enables management of the server 505 from the management terminal 605 by using communication conforming to the IPMI via the network 705.

The SPI flash 445 stores substitution BIOS data 305. The SPI flash 445 includes a serial peripheral interface (SPI).

The BMC firmware 425 is executed by a processor, not illustrated, included in the BMC 405. The BMC firmware 425 writes, when recovery update is necessary, a whole or a part of the substitution BIOS data 305 being stored on the SPI flash 445 onto the shared memory 415. The BMC firmware 425 communicates with the BIOS code 215 in conformity to the IPMI. However, the IPMI can be expanded by the OME command. The BMC firmware 425 may communicate with the BIOS code 215 in conformity to a standard other than the IPMI.

The shared memory 415 is an accessible memory using memory mapped input/output (MMIO). The shared memory 415 can be accessed by the BMC firmware 425 and the BIOS code 215.

The network interface 435 communicates with the management terminal 605.

The BIOS code 215 executed by the CPU 115 accesses the substitution BIOS data 305 written on the shared memory 415 by using the memory mapped input/output (MMIO).

Other configurations according to the present example embodiment are the same as the configuration according to the second example embodiment.

An operation according to the present example embodiment is described.

Figure 5:
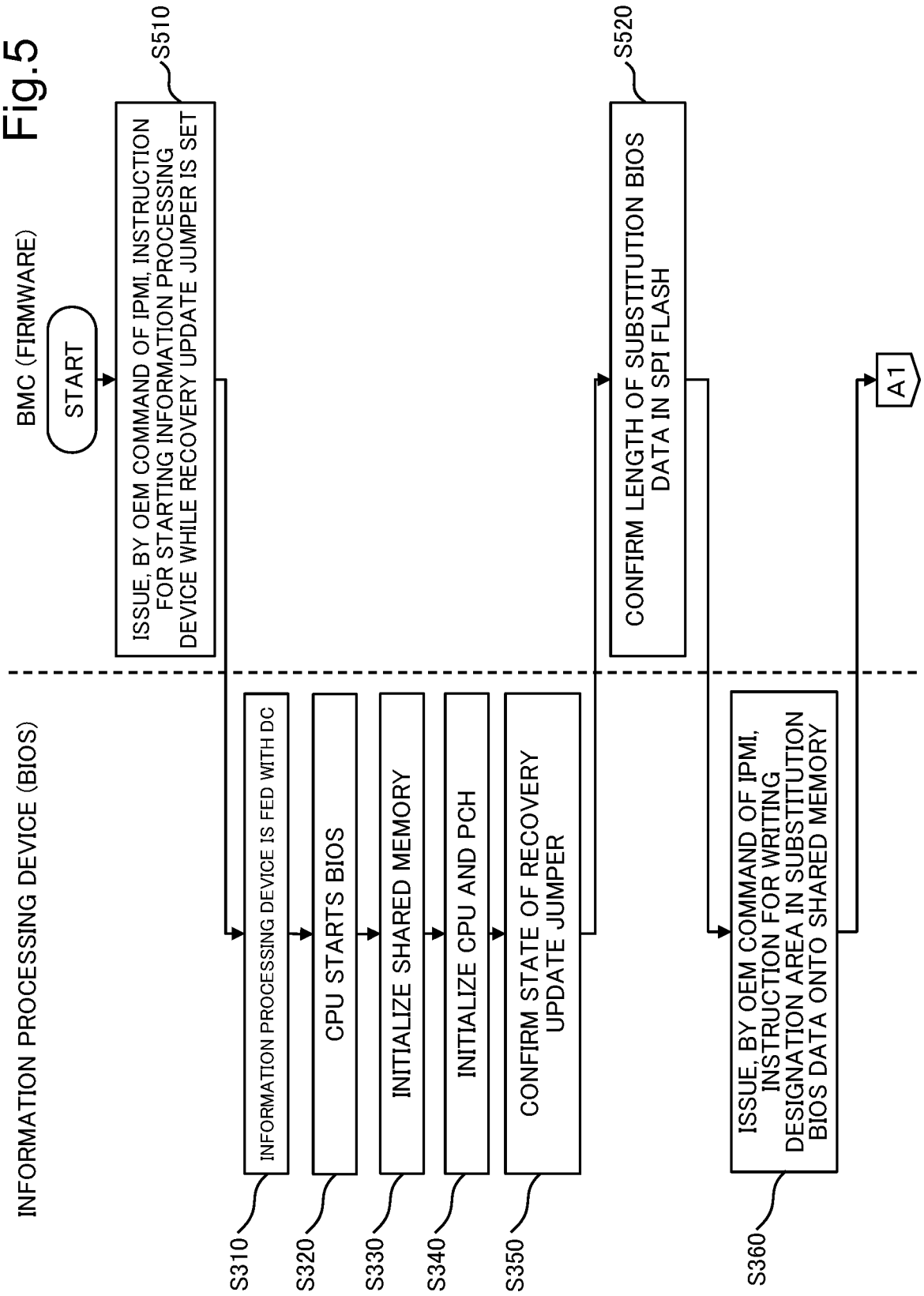
FIG. 5 is a flowchart (No. 1) illustrating an operation of the information processing device according to the third example embodiment of the present invention.
Figure 6:
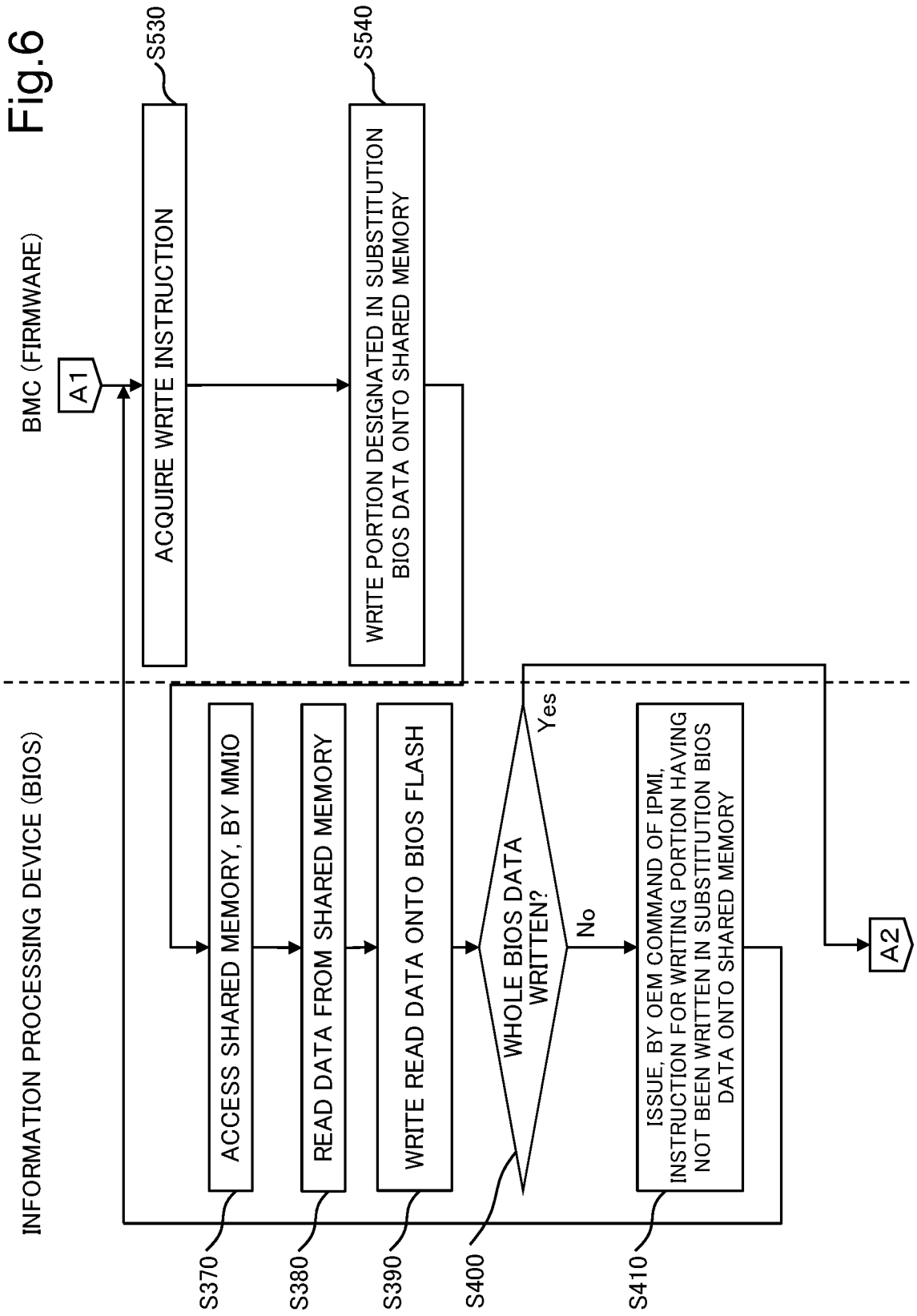
FIG. 6 is a flowchart (No. 2) illustrating an operation of the information processing device according to the third example embodiment of the present invention.
Figure 7:
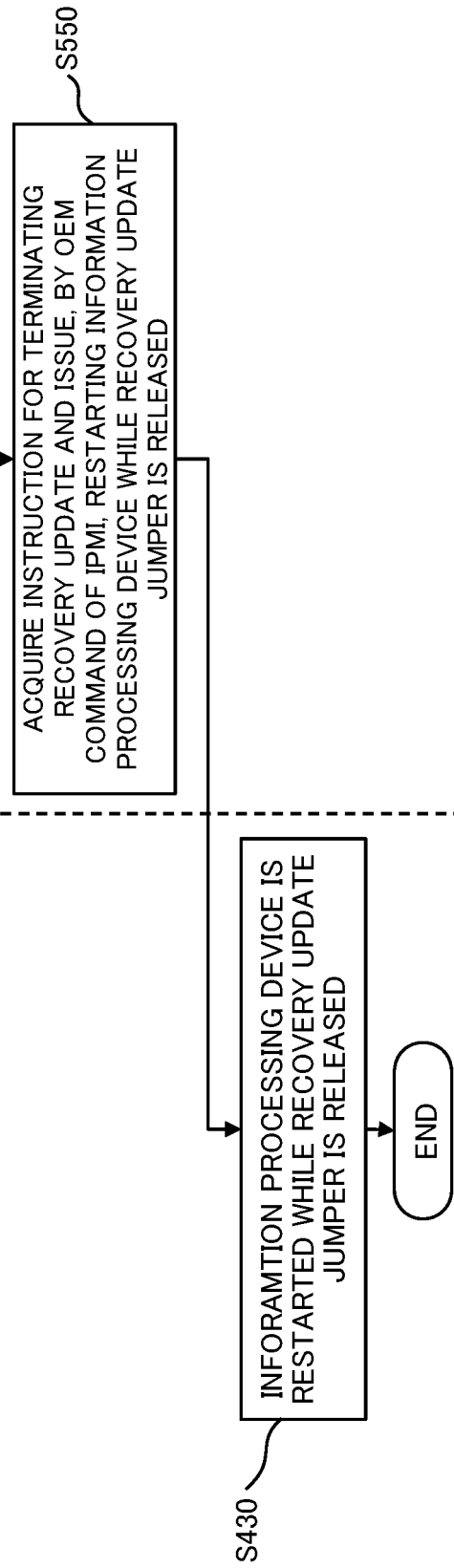
FIG. 7 is a flowchart (No. 3) illustrating an operation of the information processing device according to the third example embodiment of the present invention.

FIGS. 5 to 7 are flowcharts illustrating an operation of an information processing device and a BMC according to the third example embodiment of the present invention. In FIGS. 5 to 7, a left side illustrates an operation of the information processing device 105, and a right side illustrates an operation of the BMC 405. However, in FIGS. 5 to 7, as long as an operation subject is not specifically defined, the operation subject of the information processing device 105 is the BIOS code 215 included in the currently used BIOS data 205 being executed by the CPU 115. In FIGS. 5 to 7, as long as an operation subject is not specifically defined, the operation subject of the BMC 405 is the BMC firmware 425 being executed by the processor, not illustrated, in the BMC 405. FIGS. 5 to 7 are illustrated by dividing a series of operations into figures. The flowchart illustrated in FIGS. 5 to 7 and the following description are one example, and according to appropriately determined processing, a processing order may be switched, processing may be returned, or processing may be repeated.

The BMC firmware 425 being executed by the processor, not illustrated, in the BMC 405 (hereinafter, simply referred to as "BMC firmware 425") issues, based on the OEM command of the IPMI, an instruction for starting the information processing device 105 while the recovery update jumper 135 is set (enabled) (step S510).

The information processing device 105 acquires a setting instruction of the recovery update jumper 135 and sets the recovery update jumper 135. The information processing device 105 is fed with DC (step S310).

The CPU 115 of the information processing device 105 starts the BIOS code 215 (step S320).

The BIOS code 215 (hereinafter, simply referred to as "BIOS code 215") of the currently used BIOS data 205 being executed by the CPU 115 of the information processing device 105 initializes the shared memory 415 (step S330).

The BIOS code 215 initializes a CPU and a PCH (step S340). In other words, the BIOS code 215 terminates, at a termination time of the present step, a minimum necessary initialization for executing the recovery update.

The BIOS code 215 confirms a state of the recovery update jumper 135 (step S350).

The recovery update jumper 135 is set (enabled), and therefore the BIOS code 215 hereinafter executes the recovery update. In the present description, it is assumed that a size of the shared memory 415 is 512 KB and a size of the substitution BIOS data 305 is 8 MB.

The BMC firmware 425 confirms a data length (8 MB) of the substitution BIOS data 305 being stored on the SPI flash 445 and notifies the information processing device 105 of the confirmed data length (step S520).

The BIOS code 215 issues an instruction for a write instruction to the BMC 405, based on the OEM command of the IPMI (step S360). Herein, the write instruction is an instruction for writing a designated area of the substitution BIOS data 305 onto the shared memory 415. In the OEM command of the IPMI representing the write instruction, it is assumed that a start position (offset) and a length (size) in the substitution BIOS data 305 to be written onto the shared memory 415 can be designated.

The BMC firmware 425 acquires the write instruction from the information processing device 105 (step S530).

The BMC firmware 425 writes, onto the shared memory 415, a portion (up to 512 KB) designated by the offset and the length in the write instruction in the substitution BIOS data 305 (step S540).

The BIOS code 215 accesses the shared memory 415 by using the MMIO (step S370).

The BIOS code 215 reads the portion of the substitution BIOS data 305 written on the shared memory 415 (step S380). At that time, the main memory 155 is in a pre-initialization state, and therefore the main memory 155 is unusable. Therefore, the BIOS code 215 directly writes the data read from the shared memory 415 onto the BIOS flash 125 (step S390).

The BIOS code 215 determines whether the whole of the substitution BIOS data 305 is written on the flash ROM 125 (step S400). When the whole of the substitution BIOS data 305 is written on the flash ROM 125 (Yes in step S400), the BIOS code 215 moves processing to step S420. When the whole of the substitution BIOS data 305 is not written on the flash ROM 125 (No in step S400), the BIOS code 215 moves processing to step S410.

The BIOS code 215 issues, based on the OEM command of the IPMI, an instruction for a write instruction with respect to a portion of the substitution BIOS data 305 having not been written on the flash ROM 125 to the BMC firmware 425, and the BMC firmware 425 moves processing to step S530 (step S410). In other words, the BIOS code 215 repeatedly executes processing of steps S410, S370, S380, S390, and S400 until the whole of the substitution BIOS data 305 is written onto the flash ROM 125.

The BIOS code 215 instructs, based on the OEM command of the IPMI, the BMC firmware 425 to terminate the recovery update (step S420).

The BMC 405 acquires the instruction for terminating the recovery update and issues, based on the OEM command of the IPMI, an instruction for restarting the information processing device 105 while the recovery update jumper 135 is released (reset) (step S550).

The information processing device 105 is restarted while the recovery update jumper 135 is released (step S430).

Other operations according to the present example embodiment are the same as the operation according to the second example embodiment.

As described above, in the server system 805 according to the present example embodiment, the BIOS code 215 included in the currently used BIOS data 205 being executed by the CPU 115 executes the procedure (steps S330 and S340) necessary before updating the currently used BIOS data 205 and immediately executes the procedure (steps S350 to S410) of updating the currently used BIOS data 205. Even when, in the BIOS code 215, a code that is not executed during update of the currently used BIOS data 205 has a fault, the currently used BIOS data 205 can be normally updated when a code (steps S330 to S410) to be executed during update of the currently used BIOS data 205 does not have a fault. In other words, the BIOS code 215 increases a possibility of being able to normally update the currently used BIOS data 205, compared with a case where a code other than steps S330 to S410 is executed before update completion of the currently used BIOS data 205 having a fault. Therefore, the server 505 according to the present example embodiment produces an advantageous effect of increasing a possibility of being able to update BIOS data even when the BIOS data have a fault.

The server 505 according to the present example embodiment is useful not only in order to increase fault tolerance in recovery update of a defective BIOS but also in order to increase fault tolerance against interruption of version-upgrade work in a version update of a normal BIOS.

Figure 8:
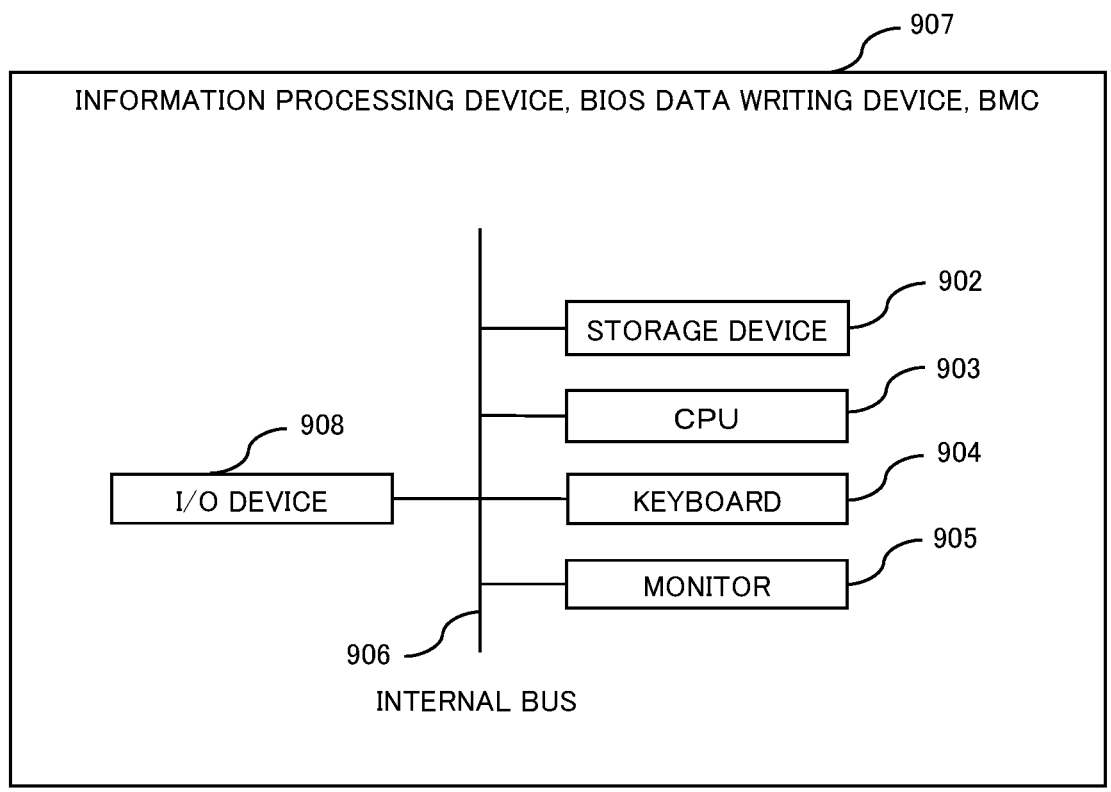
FIG. 8 is a block diagram illustrating one example of a hardware configuration capable of achieving an information processing device according to the example embodiments of the present invention.

FIG. 8 is a block diagram illustrating one example of a hardware configuration capable of achieving the information processing device, the BIOS data writing device, and the BMC according to example embodiments of the present invention.

An information processing device 907, a BIOS data writing device 907, or a BMC 907 includes a storage device 902, a central processing unit (CPU) 903, a keyboard 904, a monitor 905, and an input/output (I/O) device 908, and these are connected by an internal bus 906. The storage device 902 stores an operation program of the CPU 903. The operation program indicates the BIOS codes 210 and 211 and an operating system (OS) (not illustrated) or an application (not illustrated) of the information processing device 100; the BIOS codes 215 and an OS (not illustrated) or an application (not illustrated) of the information processing device 105; firmware (not illustrated) and an OS or an application (not illustrated) of the BIOS data writing device 400; the BMC firmware 425 of the BMC 405; and the like. The CPU 903 controls a whole of the information processing device 907, the BIOS data writing device 907, or the BMC 907, executes an operation program stored in the storage device 902, executes an operation program, based on the I/O device 908, and transmits/receives data. The internal configuration of the information processing device 907, the BIOS data writing device 907, or the BMC 907 is one example. The information processing device 907, the BIOS data writing device 907, or the BMC 907 may have a device configuration connected with the keyboard 904 and the monitor 905, as necessary.

The information processing device 907, the BIOS data writing device 907, or the BMC 907 according to the above-described example embodiments of the present invention may be achieved by a dedicated device, but an operation other than an operation of hardware for performing communication with an outside by the I/O device 908 can be achieved by a computer (information processing device). According to the example embodiments of the present invention, the I/O device 908 is an input/output unit to/from, for example, the shared memory 410, the shared memory 415, the information processing device 100 or 105, the BIOS data writing device 400, the BMC 405, the management terminal 605, or the like. In this case, the computer reads a software program stored in the storage device 902 to the CPU 903 and executes the read software program on the CPU 903. In the above-described case according to the example embodiments, the software program may be written with description capable of achieving a function of the above-described units of the information processing device 100 or 105, the BIOS data writing device 400, or the BMC 405 illustrated in FIGS. 1 and 4. However, it is assumed that these units appropriately include hardware. In such a case, the software program (computer program) can be conceived as configuring the present invention. A computer-readable storage medium storing the software program is also conceived as configuring the present invention.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-020275, filed on Feb. 7, 2018, the disclosure of which is incorporated herein in its entirety by reference.

A part or the whole of the example embodiments can be described as, but not limited to, the following supplementary notes.

(Supplementary Note 1)

An information processing system including:

a shared memory being able to write and read data using memory mapped I/O;

a BIOS data writing device being able to write desired substitution BIOS data being BIOS data onto the shared memory; and an information processing device including
a BIOS flash that non-volatilely stores currently used BIOS data being the BIOS data,
a processor being able to execute, immediately after resetting, a BIOS code included in the BIOS data stored on the BIOS flash, and
an update setting retaining means for retaining an update setting indicating whether the currently used BIOS data stored on the BIOS flash are updatable to the substitution BIOS data, wherein
the BIOS code causes the processor to execute
an update determination procedure of executing, after executing an initialization necessary for executing a determination procedure of determining whether the update setting acquired from the update setting retaining means is updatable, the determination procedure,
an update-time initialization procedure of executing, when a determination result by the update determination procedure is updatable, an initialization necessary for executing an update procedure of updating the currently used BIOS data stored on the BIOS flash to the substitution BIOS data read from the shared memory,
a BIOS update procedure of executing the update procedure when a determination result by the update determination procedure is updatable,
a non-update-time initialization procedure of executing, when a determination result by the update determination procedure is not updatable, an initialization necessary for an operation of the information processing device, and
a boot-loader call procedure of calling a boot loader when a determination result by the update determination procedure is not updatable.

(Supplementary Note 2)
The information processing system according to supplementary note 1, wherein
the BIOS data writing device is operable, regardless of whether the information processing device is started.

(Supplementary Note 3)
The information processing system according to supplementary note 1 or 2, wherein
the update-time initialization procedure executes, when executing an initialization necessary for the update procedure, a minimum necessary initialization for executing the update procedure.

(Supplementary Note 4)
The information processing system according to supplementary note 3, wherein
the information processing device further includes a random access memory, and
the minimum necessary initialization for executing the update procedure does not include an initialization of the random access memory.

(Supplementary Note 5)
The information processing system according to any one of supplementary notes 1 to 4, wherein
a length of the substitution BIOS data is larger than a storage capacity of the shared memory, and
the BIOS code, in the BIOS update procedure, reads a portion of the substitution BIOS data from the shared memory and repeats directly writing the read portion onto the BIOS flash.

(Supplementary Note 6)
The information processing system according to any one of supplementary notes 1 to 5, wherein
the BIOS update procedure modifies, after the update procedure is executed, the update setting retained in the update setting retaining means to be not updatable.

(Supplementary Note 7)
The information processing system according to any one of supplementary notes 1 to 6, wherein
the non-update-time initialization procedure modifies, when execution of an initialization necessary for an operation of the information processing device fails, the update setting retained in the update setting retaining means to be updatable.

(Supplementary Note 8)
The information processing system according to any one of supplementary notes 1 to 7, wherein
the BIOS update procedure resets the processor after the update setting is modified.

(Supplementary Note 9)
The information processing system according to any one of supplementary notes 1 to 8, wherein
the information processing device includes the shared memory.

(Supplementary Note 10)
An information processing device
being connected to a shared memory on which desired substitution BIOS data being BIOS data are written, the shared memory being able to write and read data using memory mapped I/O, the device including:
a BIOS flash that non-volatilely stores currently used BIOS data being the BIOS data;
a processor being able to execute, immediately after resetting, a BIOS code included in the BIOS data stored on the BIOS flash; and
an update setting retaining means for retaining an update setting indicating whether the currently used BIOS data stored on the BIOS flash are updatable to the substitution BIOS data, wherein
the BIOS code includes
an update determination procedure of executing, after executing an initialization necessary for executing a determination procedure of determining whether the update setting acquired from the update setting retaining means is updatable, the determination procedure,
an update-time initialization procedure of executing, when a determination result by the update determination procedure is updatable, an initialization necessary for executing an update procedure of updating the currently used BIOS data stored on the BIOS flash to the substitution BIOS data read from the shared memory,
a BIOS update procedure of executing the update procedure when a determination result by the update determination procedure is updatable,
a non-update-time initialization procedure of executing, when a determination result by the update determination procedure is not updatable, an initialization necessary for an operation of the information processing device, and
a boot-loader call procedure of calling a boot loader when a determination result by the update determination procedure is not updatable.

(Supplementary Note 11)
A BIOS update method of an information processing device
being connected to a shared memory on which desired substitution BIOS data being BIOS data are written,
the shared memory being able to write and read data using memory mapped I/O, the device including a BIOS flash that non-volatilely stores currently used BIOS data being the BIOS data, a processor being able to execute, immediately after resetting, a BIOS code included in the BIOS data stored on the BIOS flash, and an update setting retaining means for retaining an update setting indicating whether the currently used BIOS data stored on the BIOS flash are updatable to the substitution BIOS data, wherein the BIOS code executes an update determination procedure of executing, after executing an initialization necessary for executing a determination procedure of determining whether the update setting acquired from the update setting retaining means is updatable, the determination procedure, an update-time initialization procedure of executing, when a determination result by the update determination procedure is updatable, an initialization necessary for executing an update procedure of updating the currently used BIOS data stored on the BIOS flash to the substitution BIOS data read from the shared memory, a BIOS update procedure of executing the update procedure when a determination result by the update determination procedure is updatable, a non-update-time initialization procedure of executing, when a determination result by the update determination procedure is not updatable, an initialization necessary for an operation of the information processing device, and a boot-loader call procedure of calling a boot loader when a determination result by the update determination procedure is not updatable.

(Supplementary Note 12)

A BIOS update program of an information processing device, the program causing a computer included in the information processing device being connected to a shared memory on which desired substitution BIOS data being BIOS data are written, the shared memory being able to write and read data using memory mapped I/O, the device including a BIOS flash that non-volatilely stores currently used BIOS data being the BIOS data, a processor being able to execute, immediately after resetting, a BIOS code included in the BIOS data stored on the BIOS flash, and an update setting retaining means for retaining an update setting indicating whether the currently used BIOS data stored on the BIOS flash are updatable to the substitution BIOS data to execute:

an update determination procedure of executing, after executing an initialization necessary for executing a determination procedure of determining whether the update setting acquired from the update setting retaining means is updatable, the determination procedure;

an update-time initialization procedure of executing, when a determination result by the update determination procedure is updatable, an initialization necessary for executing an update procedure of updating the currently used BIOS data stored on the BIOS flash to the substitution BIOS data read from the shared memory;

a BIOS update procedure of executing the update procedure when a determination result by the update determination procedure is updatable;

a non-update-time initialization procedure of executing, when a determination result by the update determination procedure is not updatable, an initialization necessary for an operation of the information processing device; and a boot-loader call procedure of calling a boot loader when a determination result by the update determination procedure is not updatable.

INDUSTRIAL APPLICABILITY

The present invention is usable, in a device in general including a personal computer, a server, and a processor, for applications in increasing fault tolerance against a fault in a BIOS and interruption of BIOS update work.

REFERENCE SIGNS LIST 100, 105 Information processing device
110 Processor
115 CPU
120, 125 BIOS flash
130 Update setting retaining means
135 Recovery update jumper
145 PCH
155 Main memory
165 SATA interface
175 USB interface
185, 195 DVD drive
200, 205 Currently used BIOS data
210, 211, 215 BIOS code
220 Update determination procedure
230 Update-time initialization procedure
240, 241 BIOS update procedure
250, 251 Non-update-time initialization procedure
260 Boot-loader call procedure
300, 305 Substitution BIOS data
400 BIOS data writing device
405 BMC
410, 415 Shared memory
425 BMC firmware
435 Network interface
445 SPI flash
505 Server
605 Management terminal
615 Network interface
705 Network
805 Server system
902 Storage device
903 CPU
904 Keyboard
905 Monitor
906 Internal bus
907 Information processing device
908 I/O device

What is claimed is:

1. An information processing system comprising:

a shared memory being able to write and read data using memory mapped I/O;

a BIOS data writing device being able to write desired substitution BIOS data being BIOS data onto the shared memory; and an information processing device including a BIOS flash that non-volatilely stores currently used BIOS data being the BIOS data, a processor being able to execute, immediately after resetting, a BIOS code included in the BIOS data stored on the BIOS flash, and an update setting retaining unit configured to retain an update setting indicating whether the currently used BIOS data stored on the BIOS flash are updatable to the substitution BIOS data, wherein the BIOS code causes the processor to execute an update determination procedure of executing, after executing an initialization necessary for executing a determination procedure of determining whether the update setting acquired from the update setting retaining unit is updatable, the determination procedure, an update-time initialization procedure of executing, when a determination result by the update determination procedure is updatable, an initialization necessary for executing an update procedure of updating the currently used BIOS data stored on the BIOS flash to the substitution BIOS data read from the shared memory, a BIOS update procedure of executing the update procedure when a determination result by the update determination procedure is updatable, a non-update-time initialization procedure of executing, when a determination result by the update determination procedure is not updatable, an initialization necessary for an operation of the information processing device, and a boot-loader call procedure of calling a boot loader when a determination result by the update determination procedure is not updatable.

2. The information processing system according to claim 1, wherein the BIOS data writing device is operable, regardless of whether the information processing device is started.

3. The information processing system according to claim 1, wherein the update-time initialization procedure executes, when executing an initialization necessary for the update procedure, a minimum necessary initialization for executing the update procedure.

4. The information processing system according to claim 3, wherein the information processing device further includes a random access memory, and the minimum necessary initialization for executing the update procedure does not include an initialization of the random access memory.

5. The information processing system according to claim 1, wherein a length of the substitution BIOS data is larger than a storage capacity of the shared memory, and the BIOS code, in the BIOS update procedure, reads a portion of the substitution BIOS data from the shared memory and repeats directly writing the read portion onto the BIOS flash.

6. The information processing system according to claim 1, wherein the BIOS update procedure modifies, after the update procedure is executed, the update setting retained in the update setting retaining unit to be not updatable.

7. The information processing system according to claim 1, wherein the non-update-time initialization procedure modifies, when execution of an initialization necessary for an operation of the information processing device fails, the update setting retained in the update setting retaining unit to be updatable.

8. The information processing system according to claim 1, wherein the BIOS update procedure resets the processor after the update setting is modified.

9. The information processing system according to claim 1, wherein the information processing device includes the shared memory.

10. A BIOS update method of an information processing device being connected to a shared memory on which desired substitution BIOS data being BIOS data are written, the shared memory being able to write and read data using memory mapped I/O, the device including a BIOS flash that non-volatilely stores currently used BIOS data being the BIOS data, a processor being able to execute, immediately after resetting, a BIOS code included in the BIOS data stored on the BIOS flash, and an update setting retaining unit configured to retain an update setting indicating whether the currently used BIOS data stored on the BIOS flash are updatable to the substitution BIOS data, wherein the BIOS code executes an update determination procedure of executing, after executing an initialization necessary for executing a determination procedure of determining whether the update setting acquired from the update setting retaining unit is updatable, the determination procedure, an update-time initialization procedure of executing, when a determination result by the update determination procedure is updatable, an initialization necessary for executing an update procedure of updating the currently used BIOS data stored on the BIOS flash to the substitution BIOS data read from the shared memory, a BIOS update procedure of executing the update procedure when a determination result by the update determination procedure is updatable, a non-update-time initialization procedure of executing, when a determination result by the update determination procedure is not updatable, an initialization necessary for an operation of the information processing device, and a boot-loader call procedure of calling a boot loader when a determination result by the update determination procedure is not updatable.

11. A non-transitory storage medium storing a BIOS update program of an information processing device, the program causing a computer included in the information processing device being connected to a shared memory on which desired substitution BIOS data being BIOS data are written, the shared memory being able to write and read data using memory mapped I/O, the device including a BIOS flash that non-volatilely stores currently used BIOS data being the BIOS data, a processor being able to execute, immediately after resetting, a BIOS code included in the BIOS data stored on the BIOS flash, and an update setting retaining unit configured to retain an update setting indicating whether the currently used BIOS data stored on the BIOS flash are updatable to the substitution BIOS data, to execute:

an update determination procedure of executing, after executing an initialization necessary for executing a determination procedure of determining whether the update setting acquired from the update setting retaining unit is updatable, the determination procedure;

an update-time initialization procedure of executing, when a determination result by the update determination procedure is updatable, an initialization necessary for executing an update procedure of updating the currently used BIOS data stored on the BIOS flash to the substitution BIOS data read from the shared memory;

a BIOS update procedure of executing the update procedure when a determination result by the update determination procedure is updatable;

a non-update-time initialization procedure of executing, when a determination result by the update determination procedure is not updatable, an initialization necessary for an operation of the information processing device; and a boot-loader call procedure of calling a boot loader when a determination result by the update determination procedure is not updatable.

12. The information processing system according to claim 2, wherein
the update-time initialization procedure executes, when executing an initialization necessary for the update procedure, a minimum necessary initialization for executing the update procedure.

13. The information processing system according to claim 12, wherein
the information processing device further includes a random access memory, and
the minimum necessary initialization for executing the update procedure does not include an initialization of the random access memory.

14. The information processing system according to claim 2, wherein
a length of the substitution BIOS data is larger than a storage capacity of the shared memory, and
the BIOS code, in the BIOS update procedure, reads a portion of the substitution BIOS data from the shared memory and repeats directly writing the read portion onto the BIOS flash.

15. The information processing system according to claim 3, wherein
a length of the substitution BIOS data is larger than a storage capacity of the shared memory, and
the BIOS code, in the BIOS update procedure, reads a portion of the substitution BIOS data from the shared memory and repeats directly writing the read portion onto the BIOS flash.

16. The information processing system according to claim 12, wherein
a length of the substitution BIOS data is larger than a storage capacity of the shared memory, and
the BIOS code, in the BIOS update procedure, reads a portion of the substitution BIOS data from the shared memory and repeats directly writing the read portion onto the BIOS flash.

17. The information processing system according to claim 4, wherein
a length of the substitution BIOS data is larger than a storage capacity of the shared memory, and
the BIOS code, in the BIOS update procedure, reads a portion of the substitution BIOS data from the shared memory and repeats directly writing the read portion onto the BIOS flash.

18. The information processing system according to claim 13, wherein
a length of the substitution BIOS data is larger than a storage capacity of the shared memory, and
the BIOS code, in the BIOS update procedure, reads a portion of the substitution BIOS data from the shared memory and repeats directly writing the read portion onto the BIOS flash.

19. The information processing system according to claim 2, wherein
the BIOS update procedure modifies, after the update procedure is executed, the update setting retained in the update setting retaining unit to be not updatable.

* * * * *